Sept. 29, 1936.   C. J. COBERLY   2,055,480
METHOD OF AND APPARATUS FOR REDUCING SKIN FRICTION
LOSSES IN DYNAMO-ELECTRIC MACHINES
Filed July 14, 1934   2 Sheets-Sheet 1
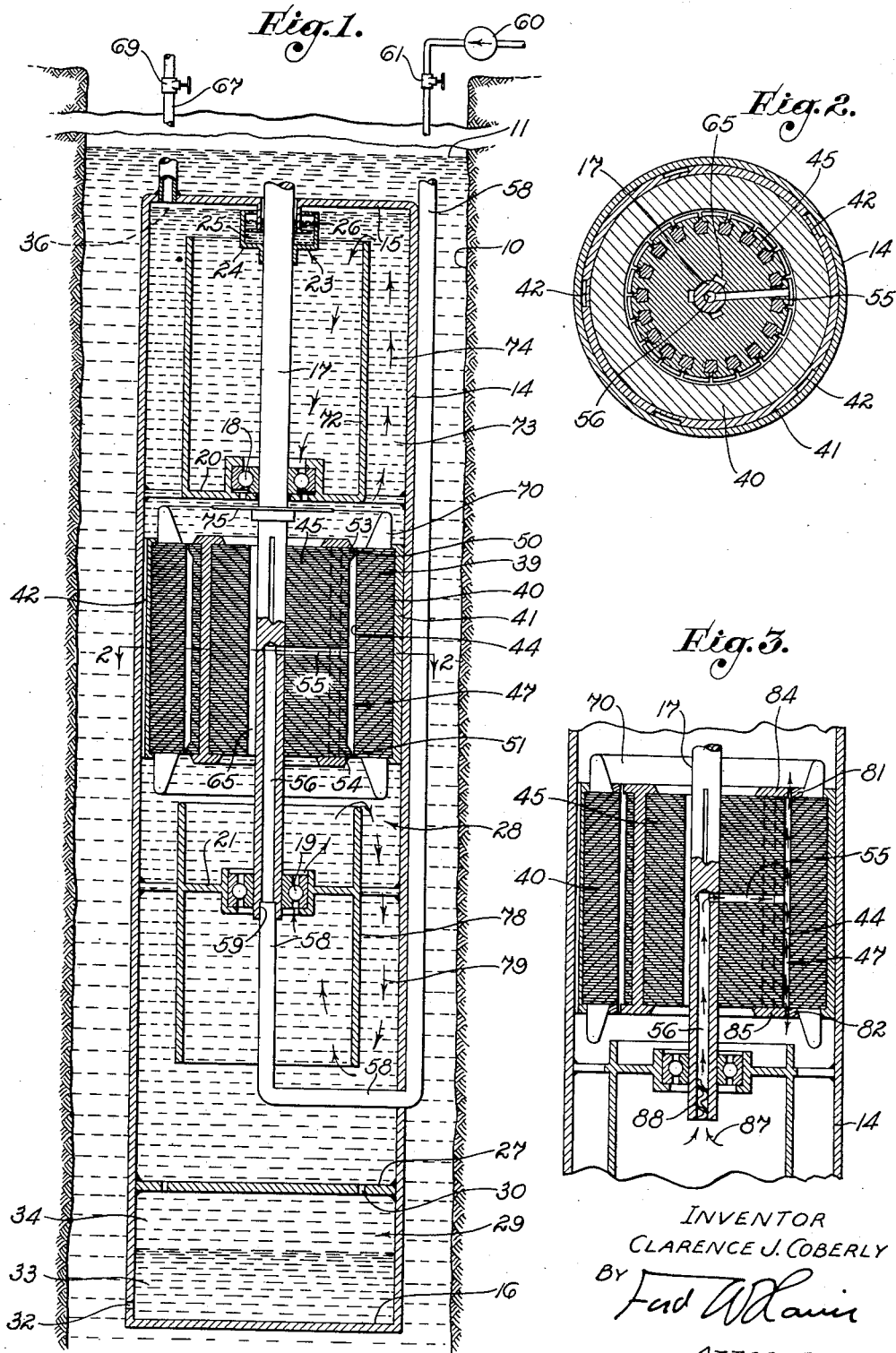
INVENTOR
CLARENCE J. COBERLY
BY
ATTORNEY.

Sept. 29, 1936.  C. J. COBERLY  2,055,480
METHOD OF AND APPARATUS FOR REDUCING SKIN FRICTION
LOSSES IN DYNAMO-ELECTRIC MACHINES
Filed July 14, 1934  2 Sheets-Sheet 2

INVENTOR
CLARENCE J. COBERLY
By Fred W Hamin
ATTORNEY.

Patented Sept. 29, 1936

2,055,480

UNITED STATES PATENT OFFICE 2,055,480

METHOD OF AND APPARATUS FOR REDUCING SKIN-FRICTION LOSSES IN DYNAMO-ELECTRIC MACHINES

Clarence J. Coberly, Los Angeles, Calif., assignor to Submersible Motor Pump Co., Ltd., Huntington Park, Calif., a corporation of California Application July 14, 1934, Serial No. 735,237

19 Claims. (Cl. 172—36)

This invention relates to dynamo-electric machines, and more particularly to a novel method and apparatus for reducing skin-friction losses therein. The invention will be described with particular reference to a submersible motor, and to the problems encountered therein, though it will be clear that I am not limited to this use, this embodiment being selected for illustrative purposes only.

The present application is a continuation-in-part of my co-pending application Serial No. 627,180, "Method of and apparatus for reducing skin friction." In that application one method of reducing skin-friction losses is disclosed, this method utilizing a suitable dielectric liquid which at the temperatures existing in the gap of a dynamo-electric machine will expel a vaporous material.

Skin-friction losses are a considerable factor in the efficiency of dynamo-electric machines, such as submersible motors. This is especially true where it is desirable to fill the motor housing with a dielectric liquid serving not only to insulate the windings, but to effectively cool them and, at the same time, insure proper lubrication. If the dielectric liquid is permitted to enter the gap of such a submersible motor, skin-friction losses often amount to several per cent of the output of the motor. At higher speeds this loss increases at a fast rate, skin-friction losses increasing approximately as the third power of the speed of rotation. This will be apparent from the fact that the skin friction loss in such a machine is represented by the following equation:

$$\text{Loss} = \phi N^3 D^4$$

Where $N$ = speed of rotation (R. P. M.)
$D$ = diameter of rotor
$\phi$ = a constant The horse power delivered by an electric motor can be represented by the equation:

$$\text{Horsepower} = CND^2$$

Where $C$ is a constant

Thus, to ascertain the percentage loss, the first equation can be divided by the second, resulting in:

$$\text{Percentage loss} = KN^2D^2$$

Where $K$ is a constant

Thus it will be apparent that the percentage loss not only increases as the square of the speed, but also as the square of the diameter of the rotor. Thus the invention is also very desirable when used in installations requiring a large diameter of rotor and results in very marked savings in this capacity.

It is an object of the present invention to provide a novel method and apparatus for decreasing such skin-friction losses.

This is accomplished in the present invention by introducing into the gap at a position between its ends some material which exerts a smaller drag on the rotor than would the dielectric liquid, and it is an object of the present invention to provide a method and apparatus for thus introducing such a medium intermediate the ends of the gap and in sufficient quantity to substantially fill the gap, thus preventing the filling of the gap by the dielectric liquid.

The material thus centrally introduced into the gap may be in the form of a gas. In other instances it may be in the form of a vapor or may take the form of a mixture of such gas or vapor with a liquid. In still other instances the material may itself comprise a liquid which will liberate a gaseous material while in the gap so as to form a gaseous atmosphere therein, and it is an object of the present invention to provide a method and apparatus for accomplishing the introduction of this material through one or the other of the elements of the dynamo-electric machine.

It is a further object of the invention to provide a method of and apparatus for introducing such a material into a central portion of the gap, and to throttle the flow of this material from one or both ends of the gap, thus retaining the material therein and preventing any excessive amount of the dielectric liquid from entering this gap.

The gaseous material escaping from the gap may or may not be condensable at the temperatures existing exterior of the gap. If any part of this gaseous material remains uncondensed, it is desirable to be able to withdraw this uncondensed material from the motor shell, and it is an object of the present invention to provide such a system.

It is a further object of the invention to supply to the gap of a submerged dynamo-electric machine, from a point above the liquid in which the machine is submerged, a material which reduces skin-friction losses in the machine.

In some instances it is desirable to not only substantially fill the gap with this gaseous material, but also to completely surround the rotor therewith, and it is a further object of the present invention to provide a structure accomplishing this result.

Further objects and advantages of the invention will be made evident hereinafter.

Referring to the drawings, which illustrate the invention in conjunction with a submersible electric motor, Fig. 1 is a vertical sectional view of a submersible motor in conjunction with a system for supplying gas to the gap.

Fig. 2 is a sectional view taken on the line 2—2 of Fig. 1.

Fig. 3 is a fragmentary sectional view of an alternative form of the invention in which a vaporizable dielectric is used.

Figure 4:
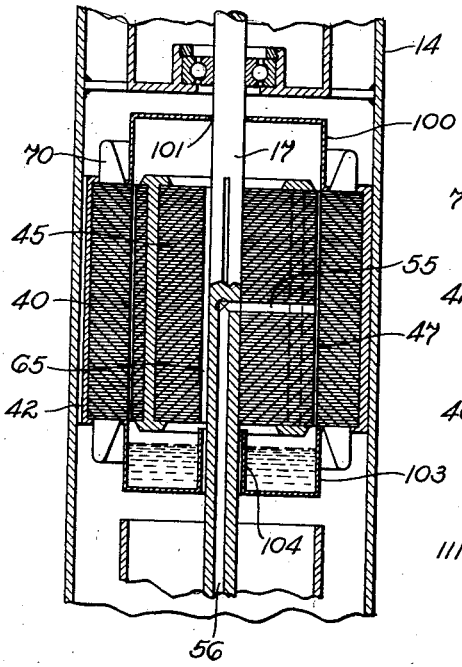
Fig. 4 is a fragmentary sectional view of an alternative form of the invention.

Referring particularly to Fig. 1, I have illustrated a well 10 containing a body of well liquid or external liquid the surface of which is indicated by the numeral 11. Positioned beneath the surface 11 is a shell 14 including an upper head 15 closing the upper end thereof and a lower head 16 closing the lower end thereof. A shaft 17 is suitably journalled in bearings 18 and 19 retained in bearing structures 20 and 21, this shaft extending upward through the upper head 15. The junction of the shaft and this upper head is sealed by a suitable sealing means 23 which may be of any suitable type. In the embodiment shown, this seal is of the fluid-packed type, preferably including a cup 24 rotating with the shaft and containing a body of mercury or other sealing liquid 25. A stationary baffle 26 extends downward from the head 15 and terminates beneath the surface of the sealing liquid.

Regardless of the type of seal utilized, it is sometimes desirable to substantially equalize the pressures on opposite sides thereof, this being especially true if a fluid-packed seal is used. In accomplishing this end a baffle 27 may extend across the shell 14, thereby defining a motor chamber 28 above this baffle and a pressure-transfer chamber or balance chamber 29 therebelow, these chambers being in communication through one or more small openings 30 bounded by the baffle. The lower end of the balance chamber 29 preferably communicates with the external liquid, this being accomplished by any suitable means. As shown, an opening 32 is provided for this purpose. The lower end of the balance chamber 29 thus contains a body of external liquid indicated by the numeral 33, the upper end of this chamber containing a body of dielectric medium usually in the form of a dielectric oil, this body being indicated by the numeral 34. So also, the motor chamber 28 may be substantially filled with this dielectric oil, the upper surface thereof being here indicated by the dotted lines 36.

Suitably secured in the chamber 28 is a dynamo-electric machine shown as being in the form of an electric motor 39. A stator 40 of this motor may conveniently be surrounded by a sheath 41. The periphery of this sheath may be of smaller diameter than the shell 14 to provide a space communicating with opposite ends of the stator, or passages 42 may be formed by the sheath to serve in this capacity. The stator 40 provides a rotor opening 44 in which a rotor 45 is positioned, this rotor being suitably secured to the shaft 17. This rotor is of smaller diameter than the rotor opening 44 so as to provide a gap 47 therebetween. In the embodiment shown in Fig. 1 this gap is shown as being greatly enlarged for illustrative purposes.

The gap construction shown in Fig. 1 includes throttle means at opposite ends thereof, these throttle means taking the form of restricted passages 50 and 51. In this embodiment these restricted passages are formed by punching the end laminations of the rotor 45 slightly larger than the intermediate laminations so as to provide beads or projections 53 and 54 which extend partially across the gap 47 and toward the walls of the rotor opening 44, but terminate short thereof to define the restricted passages 50 and 51.

In the embodiment shown a gas is supplied to this gap 47 at a section intermediate its ends. This may be accomplished by providing a passage through either the rotor or the stator communicating with this intermediate portion of the gap. As shown, this passage extends radially through the rotor 45 and is indicated by the numeral 55, the inner end of this passage communicating with a bore 56 formed upward from the lower end of the shaft 17. A pipe 58 provides an end portion which may extend into a counterbore 59 of the bore 56. It is not always necessary to make the junction between the pipe 58 and the shaft 17 a fluid-tight one, a small leakage of gas at this point being unobjectionable. However, if desired, a suitable sealing structure such as a conventional packing or other equivalent device may be used at this point.

The pipe 58 extends outward through the shell 14 and upward to a point above the surface 11 of the external liquid in which the structure is submerged. If desired, this pipe may be extended to the surface of the ground, as indicated in Fig. 1, and may be connected to the discharge of a suitable pump 60 or other source of gas. A valve 61 may be used to control the flow of gas into the gap 47. This gas is preferably of a relatively inert character. Air is quite satisfactory in this regard, though it is sometimes preferable to remove any moisture content from the air before circulating the air through the pipe 58. In other instances other gases may be used, such as hydrogen, oxygen, natural gas, etc. It should not be understood, however, that it is in all instances necessary to use a gas in the strict sense of the term. In some instances vapors can be used, and the term "gas" as used in this application is not limited to the strict sense of the term, it being only desirable to substantially fill the gap 47 with a gaseous atmosphere.

The gaseous atmosphere tends to be maintained in the gap 47 due to the restricted passages 50 and 51, and the presence of this gaseous atmosphere tends to exclude from the gap the dielectric oil in the motor chamber 28 with the result that skin-friction losses are very materially decreased. If the gap 47 were filled with the dielectric oil, the frictional drag on the rotor would often amount to several per cent of the output, and would materially increase with increase in shaft speed. Thus, the present system is particularly applicable to high speed structures. It should not be understood, however, that it is necessary to exclude all traces of the dielectric liquid from the gap 47, for if a small amount of this dielectric liquid enters the gap 47, it is not detrimental in view of the fact that excluding this dielectric liquid from any portion of the gap 47 will reduce skin-friction losses. If a small amount of dielectric liquid enters the gap during the time that the gaseous atmosphere is maintained therein, the turbulence in the gap may be sufficient to form a foam therein. The term "gaseous atmosphere" includes such a foam, and my experiments have shown that the formation of such a foam is not objectionable and that the skin-friction losses due to such a foam are very low, being only slightly higher than the almost negligible frictional drag when the gap 47 is completely filled with gas.

This gas may be supplied to the gap 47 continuously or intermittently during the operation of the motor. Any excess gas will, of course, escape through either the restricted passage 50 or the restricted passage 51 or both. If it escapes through the passage 51, it will rise through the motor either through the passages 42 or through passages 65 formed through the rotor, and will move upward to the extreme upper end of the shell 14 whence it can be discharged from the shell through a pipe 67 which preferably extends upward to a point above the surface 11, though this is not always essential. It may terminate below the surface 11 if the external liquid is such that it would not injure the motor, or if this external liquid is prevented from entering the pipe 67. In many instances the surface 36 of the dielectric liquid will lie in the pipe 67, being always near the surface 11 of the external liquid due to the action of the pressure transfer effected by the balance chamber 29. Regardless of whether or not the gas actually accumulates in the upper end of the shell 14, any excess gas discharged from the gap 47 will move upward through the dielectric liquid and will rise in the pipe 67. If desired, the upper end of the pipe 67 may be provided with a valve 69 to throttle the flow of gas, and thereby regulate to some degree the pressure in the shell 14. This is especially desirable if the balance chamber 29 is dispensed with, and makes it possible to maintain a pressure inside the shell 14 which is greater than the pressure on the exterior thereof. Such a system is often advantageous if types of seals other than that indicated by the numeral 23 are used. With a pressure-transfer system such as shown in Fig. 1, however, it is usually desirable to have the valve 69 almost completely open so that there is no danger of forcing the dielectric liquid completely from the shell 14 through the opening 30 of the balance chamber.

I have found it very desirable to maintain the dielectric oil in the motor chamber 28 for cooling and lubricating purposes. Thus, with the system shown the dielectric oil surrounds the winding of the stator, this winding being indicated by the numeral 70. The dielectric oil is also in contact with the ends of the rotor, thus tending to cool same. To assist in this cooling action I provide a baffle 72 extending upward from the bearing structure 20 so that the rotation of the rotor throws the dielectric liquid outward into a cooling space 73 formed between the baffle 72 and the shell 14 to set up a closed circulation as indicated by the arrows 74. The external liquid is ordinarily cool so that a very effective cooling of the dielectric liquid is made possible by this system, this cooled dielectric liquid thus acting to cool the motor. If desired, an auxiliary pumping means may be used to increase this flow. In Fig. 1 this pumping means is shown as comprising a plate 75 rotating with the shaft and exerting a small pumping action sufficient to increase this circulation. A similar baffle 78 is positioned below the motor, the cooling circulation being set up as indicated by the arrows 79.

While I have shown the gap 47 as being restricted at both ends, this is not always essential, though usually desirable. In some instances one or the other of the restricted passages 50 or 51 can be eliminated, usually the latter. In other instances the gap 47 can be made of uniform width with no throttle means at the ends thereof. The gaseous atmosphere will tend to escape from the upper end of the gap, though by slightly increasing the pressure of the gas supply such a system will permit escape from both ends of the gap if this action is desired.

In Fig. 3 I have illustrated an alternative form of gap which can be used in conjunction with the combination shown in Fig. 1. In this form rings 81 and 82 are positioned immediately inside the stator winding 70 and are of substantially the same diameter as the rotor opening 44. Restricted passages are formed by end rings 84 and 85 of the rotor which extend outward a slight distance beyond the periphery of the rotor and thus extend partially across the gap 47. This construction has the advantage of not changing the electrical characteristics of the motor.

So, also, in Fig. 3 I have shown an alternative system of maintaining the gaseous atmosphere in the gap 47 without the use of a separate means for supplying gas to this gap. In this form the bore 56 of the shaft 17 opens directly on the dielectric liquid in the shell 14, the radial passage 55 acting as a pumping means when the rotor is turning to draw dielectric liquid upward in this bore as indicated by the arrows 87. If desired, this pumping action can be further increased by the installation of a spiral vane 88 in the lower end of the bore 56, or the lower end of this bore can be suitably rifled to accomplish this additional pumping action if desired.

In this form of the invention the dielectric liquid utilized has the property of vaporizing or expelling vaporous material when subjected to the temperatures existing in the motor. Such a dielectric liquid may in some instances be a low boiling-point hydrocarbon which vaporizes at the temperatures present in the motor. In other instances ordinary transformer oil can be utilized, a small amount of an auxiliary substance being added thereto. This auxiliary substance should be one which, when present in the dielectric liquid, will expel a vaporous material when subjected to the temperatures existing in the motor. A large number of such auxiliary substances can be selected, as pointed out in my application supra, such as ethane, propane, butane, pentane, hexane, ethylene, propylene, butylene, amylene, or certain of the gasolines or other low boiling-point hydrocarbons such as commercial petroleum ether. As pointed out in that application, the quantity of such auxiliary substances need not be large. In other instances this dielectric liquid may be such that it entrains a gas at the temperatures existing exterior of the motor but expels this gas at the temperatures existing in the motor, as pointed out in my application supra. The terms "gaseous atmosphere", "gaseous material", and "vaporous material" include such gases or vapors as may be given off from the dielectric liquid, either with or without an auxiliary substance therein, when subjected to the temperatures existing in the motor, and include foam mixtures of such vapors or gases and a liquid.

It will be clear that the medium moving upward in the bore 56 can expel the vaporous material either before or after this medium has entered the gap 47. Usually the rotor is the hottest part of an electric motor, and in some instances the vaporous material may be expelled while rising in the bore 56 or while moving through the passage 55. In this connection the passage 55 will expel vaporous material into the gap 47, or may expel, in addition, unvaporized portions of the liquid. In other instances the bore 56 and the passage 55 may merely serve to preliminarily heat the dielectric liquid, the temperatures existing in the gap 47 being utilized to expel the vaporous material. If any liquid is present in the vaporous material in the gap 47, a foam may be formed as previously pointed out, though if the gap is made sufficiently large, any liquid discharged into the intermediate portion of the gap will merely drop downward through the gaseous atmosphere formed in this instance by the vaporous material and will move from the lower end of the gap, possibly along with a portion of the vaporous material.

It will thus be clear that the vaporous material will escape from at least one end of the gap and usually from both ends of the gap. When this material reaches the cooler zone exterior of the motor it will reunite with the dielectric liquid. Thus, if an auxiliary substance is used in the dielectric oil, and is vaporized at the temperatures existing in the motor, the vaporous material thus formed will be condensed when it reaches the cooler zones at either end of the motor. The introduction of the vaporous material, or of a medium capable of forming such vaporous material, at a section of the gap intermediate its ends, has been shown to be a very effective way of maintaining the gap substantially filled so as to prevent filling of this gap by the dielectric liquid entering the ends of the gap.

Figure 5:
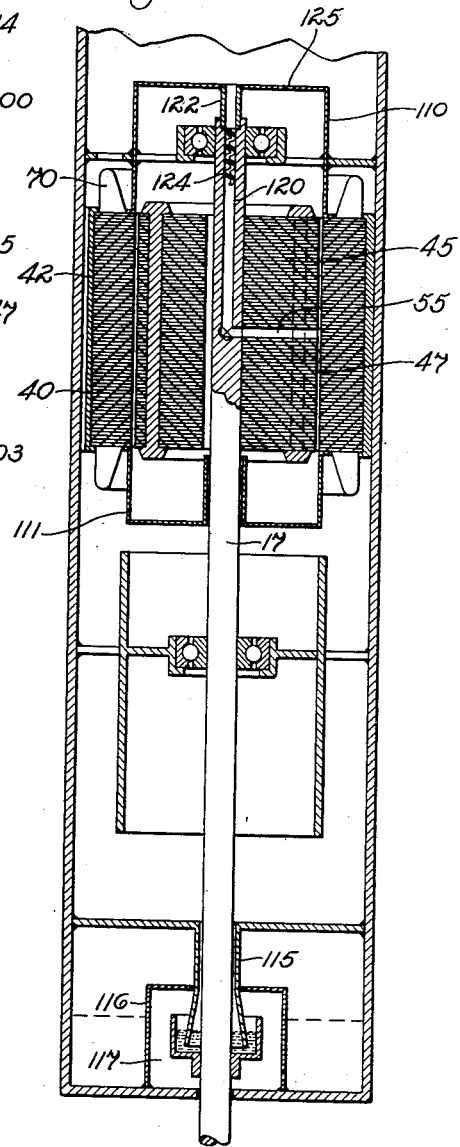
Fig. 5 is a fragmentary sectional view of another form of the invention utilizing a vaporizable dielectric.

In Figs. 4 and 5 alternative forms of the invention are illustrated which permit further decreases in skin-friction losses by excluding dielectric liquid from contact with the ends of the rotor. Thus, in Fig. 4 I have shown a baffle structure 100 in the form of a hood extending upward from a position immediately inside the stator winding and extending inward to closely surround the shaft 17, a small annular throttle space 101 being provided at this junction. A somewhat similar structure is provided below the stator and is in the form of a baffle structure 103 which extends downward from the stator and inward toward the shaft and provides an upward extending tube 104 closely surrounding the shaft. This baffle structure 103 may thus retain a body of the dielectric liquid, though this is not in all instances essential, it being sometimes possible to utilize a baffle structure 103 which extends directly inward adjacent the lower end of the rotor.

In the form of the invention shown in Fig. 4 gas may be supplied from an external source, as indicated in Fig. 1, moving through the bore 56 of the rotor as previously described. A portion of this gas may move upward from the gap 47 and escape through the small throttle space 101 and be removed from the upper end of the shell 14, as previously described. Another portion of this gap may move from the lower end of the gap 47 and be conducted to the upper end of the shell 14 either through the openings 65 of the rotor and the throttle space 101, or through the space between the tube 104 and the shaft, rising through the passages 42 at the periphery of the stator. The baffle structures 100 and 103 in effect form an inner chamber in which the rotor is positioned, the gaseous atmosphere in this chamber excluding contact between the dielectric liquid and the ends of the rotor; thus, skin-friction losses are further decreased.

In the form of the invention shown in Fig. 5 somewhat smaller baffle structures indicated by the numerals 110 and 111 are provided. In this instance, however, the shaft 17 extends downward from the shell 14, rather than upward therefrom, the balance chamber being protected from the rotating shaft by a sleeve 115 and by walls 116 which define a sealing chamber 117 in which a suitable seal may be utilized. In this instance the uppermost end of the shaft 17 provides a bore 120 which communicates with a dielectric liquid capable of expelling vaporous material when subjected to the temperatures in the motor, as previously described. If desired, a nipple 122 may extend downward from the baffle structure 110 so as to conduct the dielectric liquid downward into the bore 120. If desired, this nipple may be telescoped with respect to the shaft 17, as shown, and in some instances a sealing means may be provided between the nipple and the shaft, though this is not essential. The radial passage 55 of the rotor acts to pump a quantity of the liquid into the bore 120, thence into the gap 47. An auxiliary pumping means may, however, be used, this being shown in the form of a spiral vane 124 in the upper part of the bore 120. The upper portion of the bore 120 may be suitably rifled to secure this pumping action, if desired. In this form of the invention the vaporous material not only fills the gap 47, but contacts the ends of the rotor. While it is possible to condense or otherwise reunite the vaporous material with the liquid in the inner chamber bounded by the baffle structures 110 and 111, it is usually preferable to provide a small opening 125 through the upper baffle structure 110 to conduct the vaporous material into the cooler zone thereabove, this material being condensed or otherwise reunited with the dielectric liquid in this cool zone.

The gap constructions shown in Figs. 4 and 5 do not include the restricted passages defined with reference to Figs. 1 and 3. It will be understood, however, that such restricted passages can be used in conjunction with the baffle structures shown in Figs. 4 and 5.

While I have described the invention in conjunction with a submersible electric motor, it will be clear that the utility of the present improvement is not limited thereto. The principles set forth are clearly applicable to any dynamo-electric machine, as well as to other structures wherein it is desirable to prevent excessive skin-friction losses. It will further be clear that the invention is not limited to the auxiliary features shown, the embodiments herein described in detail being for illustrative purposes only. Various modifications will be apparent to those skilled in the art and fall within the scope of the following claims.

The gap constructions herein shown are claimed per se in my copending application, Serial No. 735,238, entitled Motor construction.

I claim as my invention:

1. A method of reducing skin-friction losses in the gap of a dynamo-electric machine, said gap communicating at its ends with a liquid normally tending to enter said gap, which method includes the steps of: heating said gap; and introducing into said gap at a section intermediate the ends of said gap a dielectric liquid which at the temperature existing in said gap expels a vaporous material whereby said vaporous material substantially fills said gap and tends to flow from the ends of said gap.

2. A method of reducing skin-friction losses in the gap of a dynamo-electric machine bounded by a rotor and a stator closer together at one end of said gap than at an intermediate section to provide a throttle space, which method includes the steps of: heating said gap; and introducing into said gap at a section intermediate the ends of said gap a dielectric liquid which at the temperature existing in said gap expels a vaporous material whereby said vaporous material substantially fills said gap and tends to flow longitudinally along said gap from said intermediate section toward and through said throttle space and into said liquid with which said gap communicates, said throttle space thus throttling the flow of said vaporous material from said gap whereby said gap remains substantially filled with said vaporous material during operation of said dynamo-electric machine.

3. In combination in a dynamo-electric machine: a stationary element including a stator providing a rotor opening; a rotatable element including a rotor positioned to rotate in said rotor opening and cooperating with said stator in providing a gap therebetween; walls forming a passage through one of said elements and communicating with said gap at a section intermediate its ends; means for supplying a medium to said passage; and throttle means at one end of said gap and of smaller cross-sectional area than said gap, said throttle means including a projection associated with one of said elements and extending toward the other of said elements to provide a restricted passage of smaller cross-sectional area than said gap and throttling the flow of said medium from said gap.

4. A combination as defined in claim 3 in which the ends of said gap communicate with a liquid tending normally to enter said gap, and including in addition a throttle means at the other end of said gap comprising a projection associated with one of said elements and extending toward the other of said elements to provide a restricted passage of smaller cross-sectional area than said gap whereby said medium tends to be confined in said gap between the ends thereof and escapes slowly from said gap through said throttle means.

5. In combination in a dynamo-electric machine: a shell containing a dielectric liquid; a stationary element including a stator in said shell, said stator providing a rotor opening therein; a rotatable element including a rotor in said rotor opening and cooperating with said stator in defining a vertically extending gap, the upper and lower ends of said gap communicating with said dielectric liquid whereby said dielectric liquid normally tends to enter said gap; walls defining a passage through one of said elements and communicating with said gap; and means for flowing a material through said passage and toward said gap, said material forming a gaseous atmosphere substantially filling said gap and moving longitudinally along said gap toward said ends and from said ends into said dielectric liquid thereby preventing filling of said gap by said dielectric liquid, said gaseous atmosphere exerting a smaller skin-friction drag on said rotor than would said dielectric liquid.

6. A combination as defined in claim 5 in which said dielectric liquid is capable of expelling a vaporous material at the temperature existing in said gap, and in which said last-named means forces a stream of said dielectric liquid into said passage whereby said dielectric liquid is heated and expels said vaporous material to form said gaseous atmosphere in said gap.

7. In combination in a dynamo-electric machine: a stationary element including a stator and a winding thereon, said stator providing a rotor opening; a rotatable element including a rotor in said rotor opening and cooperating with said stator in defining a gap; means for introducing into said gap at a position intermediate its ends a dielectric liquid which at the temperature in said gap expels a vaporous material; and throttle means at each end of said gap and tending to retain said vaporous material in said gap by throttling the flow of said vaporous material from said gap.

8. In combination in a dynamo-electric machine: stationary element including a stator and a winding thereon, said stator providing a rotor opening; a rotatable element including a rotor in said rotor opening and cooperating with said stator in defining a gap; a dielectric liquid capable when heated to the temperature existing in said rotor during operation of said dynamo-electric machine of expelling a vaporous material; walls forming a passage through said rotor, one end of said passage communicating with said dielectric liquid and the other end of said passage communicating directly with said gap whereby dielectric liquid enters said passage and is heated by said rotor to expel said vaporous material, said vaporous material substantially filling said gap; and a throttle means for throttling the flow of said vaporous material from said gap, said throttle means including a restricted passage communicating with said gap and of smaller cross-sectional area than said gap.

9. In combination in a dynamo-electric machine: a shell containing a dielectric liquid; a stationary element including a stator in said shell and providing a rotor opening; a rotatable element including a rotor in said rotor opening said rotatable element cooperating with said stationary element in defining a gap communicating at its ends with said dielectric liquid; means for continuously delivering a gas to said gap, a portion of said gas escaping from said gap and rising through said dielectric liquid; and means for withdrawing gas from the upper end of said shell.

10. A combination as defined in claim 9 including means for throttling the flow of said gas escaping from said gap into said dielectric liquid to maintain the pressure in said gap greater than the pressure of said dielectric liquid with which said throttle means communicates.

11. In combination in a submersible electric motor: a shell containing a dielectric liquid and submerged beneath the surface of an external liquid; a stationary element in said shell including a stator; a rotatable element in said shell and including a rotor cooperating with said stator in defining a gap communicating with said dielectric liquid; means for delivering a gas from a position above said surface of said external liquid to said gap to substantially fill said gap with said gas and thereby prevent entrance of said dielectric liquid thereinto, a portion of said gas escaping from said gap and rising to the upper end of said shell; and means communicating with the upper end of said shell for withdrawing gas therefrom.

12. A method of reducing skin-friction losses in a gap of a dynamo-electric machine bounded by a rotor and a stator and open at its ends to communicate with a liquid normally tending to enter said gap, which method includes the steps of: heating a dielectric liquid to such temperature that a vaporous material is expelled therefrom; introducing said vaporous material into an intermediate portion of said gap to displace said liquid therefrom and to prevent filling of said gap by said liquid; and moving said vaporous material longitudinally in said gap and from at least one end thereof.

13. A method of reducing skin-friction losses in a gap of a dynamo-electric machine bounded by a rotor and a stator in closer proximity at one end than at an intermediate portion thereof to form a throttle space, the ends of said gap communicating with a liquid normally tending to enter said gap, which method includes the steps of: heating a dielectric liquid to such temperature that a vaporous material is expelled therefrom; and moving said vaporous material into said intermediate portion and thence from said intermediate portion longitudinally along said gap toward said throttle space and thence through said throttle space and into said liquid communicating with said gap to displace said liquid from said gap and prevent filling of said gap by said liquid.

14. In combination in a dynamo-electric machine: a stationary element including a stator providing a rotor opening; a rotatable element including a rotor positioned in said rotor opening, said rotatable member cooperating with said stationary element in providing a gap; a shell enclosing said elements and containing a liquid, the ends of said gap being beneath the surface of said liquid and in communication therewith whereby said liquid tends to normally enter said gap; walls forming a passage through one of said elements and communicating with said gap; and a gas pump forcing a stable gas through said passage and into said gap to flow longitudinally therealong through the ends thereof and into said liquid, thus displacing liquid from said gap and preventing filling of said gap by said liquid.

15. In combination in a dynamo-electric machine: a stationary element including a stator providing a rotor opening therein; a rotatable element including a rotor in said rotor opening, said rotatable element cooperating with said stationary element in defining a gap; a shell around said elements and containing a dielectric liquid capable of expelling a vaporous material at the temperature existing in said gap, opposite ends of said gap communicating with said dielectric liquid; walls defining a passage through one of said elements and communicating directly with said gap; means for forcing a stream of said dielectric liquid into said passage whereby said dielectric liquid is heated and expels said vaporous material to form a gaseous atmosphere substantially filling said gap and preventing filling of said gap by said dielectric liquid, said gaseous atmosphere exerting a smaller skin-friction drag on said rotor than would said dielectric liquid; and a throttle means at one end of said gap for throttling the flow of said vaporous material from said gap.

16. A combination as defined in claim 11 including a throttle means associated with said last-named means and throttling the flow of gas therethrough and thus controlling the pressure in said shell.

17. In combination in a dynamo-electric machine: a stationary element including a stator providing a rotor opening; a rotatable element including a rotor in said rotor opening and cooperating with said stator in defining a gap; an inner shell defining a space in which said rotor turns; an outer shell containing a dielectric liquid capable when heated to the temperature existing in said gap during operation of said dynamo-electric machine of expelling a vaporous material; and walls forming a passage through one of said elements and communicating at one end with an intermediate portion of said gap and at its other end with said dielectric liquid whereby said dielectric liquid communicates with said gap and is heated to expel said vaporous material, said vaporous material escaping from said gap into said inner shell to surround said rotor with said vaporous material.

18. In combination in a dynamo-electric machine: a stationary element including a stator providing a rotor opening; a rotatable element including a rotor in said rotor opening and cooperating with said stator in defining a gap; an inner shell defining a space in which said rotor turns; an outer shell containing a dielectric liquid capable when heated to the temperature existing in said gap during operation of said dynamo-electric machine of expelling a vaporous material; and pumping means intaking from said dielectric liquid and discharging into said gap to deliver said dielectric liquid to said gap to cause expellation of said vaporous material, said vaporous material escaping from said gap into said inner shell to surround said rotor with said vaporous material.

19. A method of reducing skin-friction losses in a gap of a dynamo-electric machine bounded by a rotor and a stator and open at its ends to communicate with a liquid normally tending to enter said gap, which method includes the steps of: introducing into an intermediate portion of said gap a gas; and flowing said gas longitudinally along said gap in opposite directions from said intermediate section and toward and from said ends of said gap into said liquid with which said ends of said gap communicate.

CLARENCE J. COBERLY.